US010695850B2

(12) United States Patent
Schieke

(10) Patent No.: US 10,695,850 B2
(45) Date of Patent: Jun. 30, 2020

(54) METHOD FOR HONING TOOTHED WHEELS

(71) Applicant: Präwema Antriebstechnik GmbH, Eschwege/Werra (DE)

(72) Inventor: Jörg Schieke, Erfurt-Marbach (DE)

(73) Assignee: Präwema Antriebstechnik GmbH, Eschwege/Werra (DE)

(*) Notice: Subject to any disclaimer, the term of this patent is extended or adjusted under 35 U.S.C. 154(b) by 0 days.

(21) Appl. No.: 15/744,141

(22) PCT Filed: Jul. 18, 2016

(86) PCT No.: PCT/EP2016/067038
§ 371 (c)(1),
(2) Date: Jan. 12, 2018

(87) PCT Pub. No.: WO2017/013056
PCT Pub. Date: Jan. 26, 2017

(65) Prior Publication Data
US 2018/0200814 A1    Jul. 19, 2018

(30) Foreign Application Priority Data

Jul. 17, 2015 (DE) .......................... 10 2015 111 663

(51) Int. Cl.
*B23F 19/05* (2006.01)
*B23F 5/16* (2006.01)
(52) U.S. Cl.
CPC ............ *B23F 19/057* (2013.01); *B23F 5/163* (2013.01); *B23F 5/166* (2013.01); *B23F 19/05* (2013.01)
(58) Field of Classification Search
CPC .......... B23F 23/1225; B23F 5/02; B23F 1/02; B23F 5/08; B23F 5/04; B23F 23/10; B23F 23/12

(Continued)

(56) References Cited

U.S. PATENT DOCUMENTS

| 5,413,520 A * | 5/1995 | Feisel ................... B23F 19/055 451/1 |
| 5,645,467 A * | 7/1997 | Schriefer .............. B23F 19/007 409/10 |

(Continued)

FOREIGN PATENT DOCUMENTS

| CN | 1102368 A | 5/1995 |
| CN | 1868651 A | 11/2006 |

(Continued)

OTHER PUBLICATIONS

Schriefer; "Spheric Honing Machine ZH250"; Jul. 14, 1999; pp. 1-18; Rochester, New York.

(Continued)

*Primary Examiner* — Orlando E Aviles
*Assistant Examiner* — Aaron R McConnell
(74) *Attorney, Agent, or Firm* — The Webb Law Firm

(57) ABSTRACT

A method for honing processing a toothed wheel in which the toothed wheel and a honing tool mesh with each other and the rotation axes of the toothed wheel and honing tool intersect at an axial intersection angle. The toothed wheel and honing tool carry out a relative movement which oscillates in an axial direction of the rotation axis of the toothed wheel and are positioned in a direction towards each other at the same time in a radial direction with respect to the rotation axis of the toothed wheel starting from an end position in order to remove material from the toothed wheel. During the oscillating relative movement which is directed in an axial direction of the rotation axis of the toothed wheel, the rotation position of the toothed wheel with respect to the rotation axis thereof is changed in accordance with the positioning in a radial direction.

15 Claims, 4 Drawing Sheets

(58) Field of Classification Search
USPC .......................... 451/47, 147, 219, 253, 900
See application file for complete search history.

(56) References Cited

U.S. PATENT DOCUMENTS

| | | | |
|---|---|---|---|
| 7,172,495 | B2 | 2/2007 | Kobialka |
| 2016/0184910 | A1* | 6/2016 | Brandsberg ......... B23F 23/1231 451/47 |

FOREIGN PATENT DOCUMENTS

| | | |
|---|---|---|
| CN | 103231125 A | 8/2013 |
| DE | 10027011 A1 | 12/2001 |
| DE | 10242569 A1 | 4/2004 |
| DE | 202006002878 U1 | 4/2006 |
| JP | 398713 A | 4/1991 |
| JP | 4193414 A | 7/1992 |
| JP | 4406895 B2 | 2/2010 |

OTHER PUBLICATIONS

Bausch et al.; "Innovative Zahnradfertigung"; expert verlag, 2011; 22 pp.; 4th edition; Renningen, Germany.

\* cited by examiner

METHOD FOR HONING TOOTHED WHEELS

CROSS-REFERENCE TO RELATED APPLICATIONS

This application is the United States national phase of International Application No. PCT/EP2016/067038 filed Jul. 18, 2016, and claims priority to German Patent Application No. 10 2015 111 663.4 filed Jul. 17, 2015, the disclosures of which are hereby incorporated in their entirety by reference.

BACKGROUND OF THE INVENTION

Field of the Invention

The invention relates to a method for honing processing a toothed wheel in which the toothed wheel which is intended to be honed in each case and a honing tool which is provided with a tooth arrangement which corresponds to the tooth arrangement of the toothed wheel are brought into engagement with each other so as to rotate about a rotation axis. In this instance, the rotation axes of the toothed wheel and honing tool are orientated so as to intersect with each other at an axial intersection angle. At the same time, the toothed wheel and honing tool are moved in an oscillating manner relative to each other in an axial direction of the rotation axis of the toothed wheel between two reversal positions. In this instance, the toothed wheel and the honing tool are positioned in a direction towards each other in a movement which is superimposed on the oscillating movement in a radial direction with respect to the rotation axis of the toothed wheel starting from an end position of the radial positioning in order to bring about a material removal on the toothed wheel.

Description of Related Art

The tooth arrangement or toothed wheel honing operation is a clamping fine processing method using a geometrically non-determined blade. This honing method is generally used in the fine processing of hardened toothed wheels whose geometries and surface nature are subjected to extremely high demands.

The honing tool used for the honing processing operation, also referred to as a honing wheel, honing ring or honing stone, generally comprises a synthetic resin or ceramic compound, in which hard material grinding grains of white corundum, sintered corundum or boron nitride are embedded.

In the toothed wheel honing operation, the toothed-wheel-like honing tool and the toothed wheel which is intended to be processed roll continuously on each other in synchronous rotation movements. The tooth arrangements of the honing tool and toothed wheel mesh in this instance at an axial intersection angle which is adjusted between the skewed rotation axes of the honing tool and toothed wheel.

As a result of the rolling rotation and the axial intersection angle, there is between the tooth flanks of the honing tool and the tooth flanks of the toothed wheel which is intended to be processed during rolling contact a sliding relative movement which brings about the chip removal on the toothed wheel. The sliding movement of the honing tool in contact with a tooth flank of the toothed wheel is composed of a radial movement which is produced by the rolling rotation and an axial movement which is produced by the axial intersection angle.

At the same time, the honing tool is moved relative to the toothed wheel or the toothed wheel is moved relative to the honing tool in the direction of the rotation axis of the toothed wheel in order to achieve a uniform processing of the tooth flanks of the toothed wheel over the width thereof. The material removal is in this instance adjusted by means of the positioning in a radial direction. If the toothed wheel which is intended to be honed has an inclined tooth arrangement, the oscillating movement is carried out as a "helical movement" by there being superimposed on the linear movement of the toothed wheel along the rotation axis thereof a rotation about the rotation axis thereof.

With the procedure explained above, the tooth flanks of a toothed wheel can be processed in such a manner that they not only correspond to the strict requirements with respect to the precision of the geometry thereof, but also in the regions in which there is produced contact of toothed wheels which mesh with each other during use, have a surface nature which, in gear mechanisms which are lubricated with gear oils which have a viscosity which is nowadays standard, ensures minimised production of noise.

SUMMARY OF THE INVENTION

However, new developments in the field of the automotive industry are directed towards also using fluid oils in gear mechanisms. It has been found that when such oils are used the noise emissions from such a gear mechanism increase.

Against this background, an object of the invention was to provide a method for honing processing of toothed wheels whose surface nature is further optimised so that gear mechanisms which are provided with toothed wheels which are processed according to the invention cause minimised noise emissions.

The invention has achieved this object in that in the honing processing of toothed wheels the steps set out herein are carried out.

Advantageous embodiments of the invention are set out and are explained in detail below, in the same manner as the general notion of the invention.

In the method according to the invention for honing processing a toothed wheel, the toothed wheel which is intended to be honed in each case and a honing tool which is provided with a tooth arrangement which corresponds to the tooth arrangement of the toothed wheel are brought into engagement with each other so as to rotate about a rotation axis, wherein the rotation axes of the toothed wheel and honing tool are orientated so as to intersect with each other at an axial intersection angle, wherein the toothed wheel and honing tool are moved in an oscillating manner relative to each other in an axial direction of the rotation axis of the toothed wheel between two reversal positions and wherein the toothed wheel and the honing tool are positioned towards each other starting from an end position in a radial direction with respect to the rotation axis of the toothed wheel in order to bring about a material removal on the toothed wheel.

According to the invention, during the oscillating relative movement which is directed in an axial direction of the rotation axis of the toothed wheel, the rotation position of the toothed wheel with respect to the rotation axis thereof is now changed in accordance with the positioning in a radial direction in such a manner that, during the removal from the respectively associated tooth gap of the toothed wheel, which removal is directed in a radial direction and leads to the respective end position of the positioning which is carried out in a radial direction, there is contact between the respective tooth of the honing tool and one of the flanks of the teeth of the toothed wheel which delimit the respective tooth gap.

The invention is based on the notion, during the honing processing of a toothed wheel, of coupling the relative movement between the toothed wheel and honing tool, by means of which the positioning in a radial direction is brought about, with an additional rotation of the toothed wheel taking place about the rotation axis thereof in such a manner that, when the toothed wheel is removed from the honing tool, that is to say, when the toothed wheel is lifted out of the tooth gap in the radial direction counter to the positioning movement, the tooth flanks of the toothed wheel and honing tool are always in contact until the toothed wheel has reached its respective end position of the positioning which is carried out in a radial direction. In this instance, the tooth flank of the toothed wheel slides on the tooth flank of the honing tool associated therewith, with the result that, in the region of the sliding contact, any protuberances or other occurrences of non-uniformity of shape are leveled out. This is advantageously carried out for both flanks of the teeth of the toothed wheel which is intended to be honed.

By the honing tool touching the tooth flank which is processed by the respective tooth when the respective tooth is removed, the processing marks which are present on the surface of the respective flank and which originate from previous processing operations are consequently "erased" and uniformly distributed, optimised surface roughness levels are achieved over the entire width of the respective flank. Typical mean roughness depths Rz are below 1 μm with flank surfaces which have been honed according to the invention.

As a result of the minimised surface roughness, in gear mechanisms which are provided with toothed wheels which have been processed in accordance with the invention, there can be used thinner oils which as a result of their low level of viscosity bring about only minimised losses and consequently allow optimised use of the drive energy of the vehicle, in which the gear mechanism is installed.

At the same time, as a result of the surfaces of the tooth flanks of a toothed wheel which has been processed according to the invention, which surfaces have been optimised according to the invention, an optimum rolling behaviour is achieved in combination with correspondingly minimised noise emissions.

The procedure according to the invention is particularly effective when the contact between the respective flank of the tooth of the toothed wheel and the associated flank of the tooth of the honing tool is kept constant until the toothed wheel has reached its end position of the positioning which is carried out in a radial direction or, if the respective tooth is lifted completely out of the tooth gap when moving to the end position, until the tooth has left the tooth gap.

The invention can be used in a particularly advantageous manner in the honing processing of an externally toothed toothed wheel which is processed using a honing tool which is generally constructed in an annular manner and which has an internal tooth arrangement.

If the toothed wheel which is intended to be processed has an inclined tooth arrangement, it is also possible in the method according to the invention in a manner known per se to superimpose a rotation about the rotation axis of the toothed wheel on the oscillating relative movement which is directed in the direction of the rotation axis of the toothed wheel.

The effectiveness with which the method according to the invention can be carried out can be increased in that both during the introduction into and removal from the respective tooth gap of the toothed wheel, which introduction starts from the respective end position of the positioning which is carried out in a radial direction, there is permanent contact between one of the tooth flanks of the teeth of the toothed wheel which delimit the tooth gap and the associated tooth of the honing tool. To this end, when the respective tooth of the honing tool is introduced into the tooth gap which is associated therewith in each case, there may be contact with the flank of one tooth which delimits the tooth gap at one side thereof and during removal from the respective tooth gap contact with the flank of the other tooth which delimits the tooth gap at the other side thereof.

In order to process according to the invention the two flanks of the teeth which in each case laterally delimit a tooth gap, in the honing processing according to the invention at least two revolutions about the rotation axis thereof can be carried out, wherein the respective tooth of the honing tool, in the event of a revolution during the removal, is kept, until the end position of the positioning which is carried out in a radial direction is reached, in contact with the flank of the tooth gap of the toothed wheel associated therewith in each case, which flank delimits the tooth gap at the side thereof located at the front when viewed in the rotation direction of the toothed wheel and, in the event of another revolution during the removal, is kept, until it has been completely removed from the tooth gap, in contact with the flank of the tooth gap of the toothed wheel then associated therewith, which flank delimits the tooth gap at the rear side thereof when viewed in the rotation direction of the toothed wheel. In this manner, the "left" and "right" flanks of the teeth of the toothed wheel when a toothed wheel is viewed from the front can be processed in a uniform manner according to the invention. It is self-evident in this case that not only two, but generally in practice a large number of revolutions can be carried out in order to completely process the toothed wheel.

BRIEF DESCRIPTION OF THE DRAWINGS

The invention is explained in greater detail below with reference to a drawing which illustrates an embodiment. In the schematic drawings.

DESCRIPTION OF THE INVENTION

Figure 1:
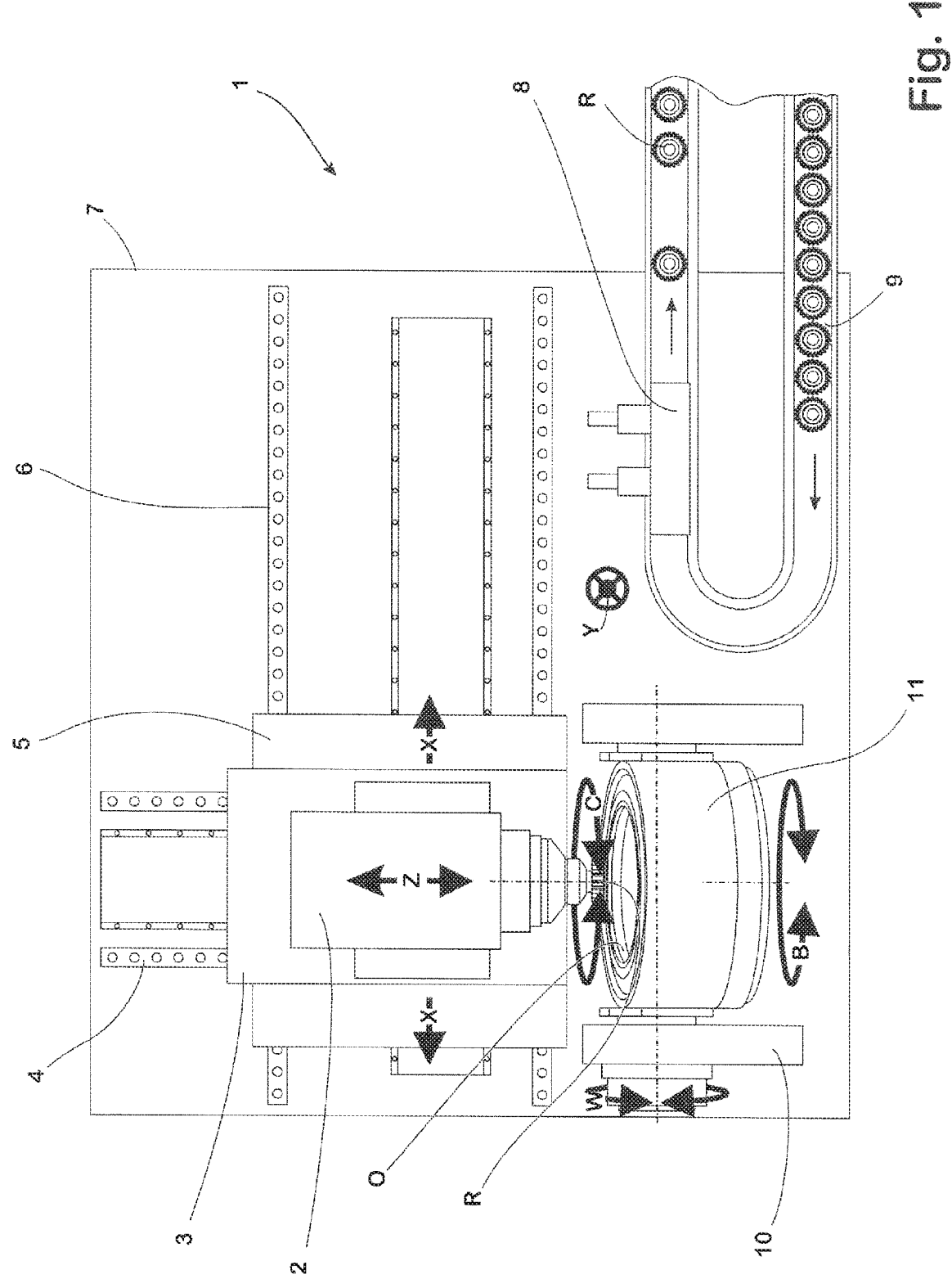
FIG. 1 is a plan view of a machine for carrying out the method according to the invention.
Figure 2:
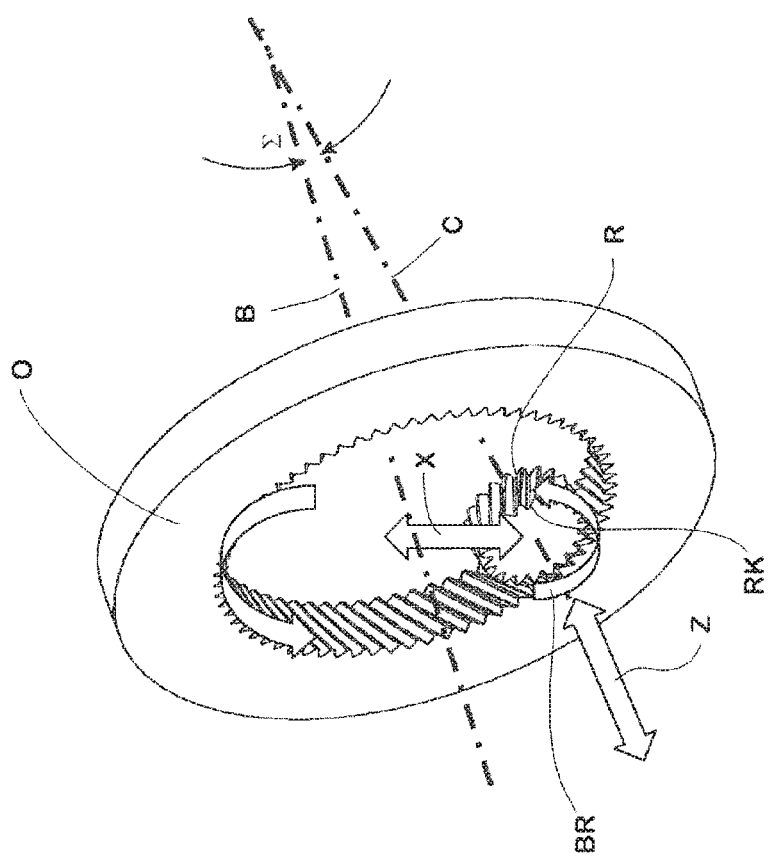
FIG. 2 is a perspective view from above of an externally toothed toothed wheel during the honing processing using a honing tool which is constructed as a honing ring.

The machine 1 for the honing processing of toothed wheels R, which machine is illustrated in FIG. 1 and corresponds in terms of its basic concept to a machine having six machine axes, that is to say, linear movement axes X, Y, Z, rotation axes B, C and a pivot axis W, comprises a workpiece spindle 2, on one end face of which a toothed wheel R which is intended to be processed is retained in a manner known per se. Via the drive of the workpiece spindle 2, the respective toothed wheel R is rotatably driven about the first rotation axis C.

The workpiece spindle 2 is supported on a longitudinal slide 3 which can be displaced on a linear guide 4 by means of a linear drive along the linear movement axis Z. The linear guide 4 with the linear drive thereof is in this instance arranged on a transverse slide 5 which is supported on a second linear guide 6 and which can be moved by means of a second linear drive along the second linear movement axis X.

The linear movement axis X is orientated at right angles with respect to the linear movement axis Z. Both linear movement axes X, Z are in this instance orientated horizontally and parallel with the planar surface of a machine bed 7 which carries the structures of the machine 1. In a state perpendicular thereto and orientated in a vertical direction is the third linear movement axis Y about which a loading device 8 which is arranged in the region of one end of the linear guide 6 pivots in order to take completely processed toothed wheels R from the workpiece spindle 2 and to place them on a conveying device 9 and from there to transfer toothed wheels R which are intended to be freshly processed to the workpiece spindle 2.

At the other end portion thereof, there is arranged parallel with the linear guide 6 a frame 10 in which a tool spindle 11 is pivotably supported about the pivot axis W which is arranged parallel with the linear guide 6. In the tool spindle 11, a honing tool O which is constructed as an internally toothed honing ring is supported and rotatably driven about the rotation axis B.

The rotation axes B, C intersect at an axial intersection angle $\Sigma$ which can be adjusted and changed during the honing processing of the toothed wheel R which is intended to be processed in each case and which is clamped in the workpiece spindle 2 by pivoting the tool spindle 11 about the pivot axis W.

The positioning of the toothed wheel R which is intended to be processed in a radial direction with respect to the honing tool O is carried out during the processing operation by means of an adjustment of the transverse slide 5 along the linear movement axis X.

At the same time, the toothed wheel R carries out an oscillating movement in the direction of the linear movement axis Z which is orientated in an axially parallel manner with respect to the rotation axis C. In this instance, the respective toothed wheel R is moved from an end position of the positioning thereof which is carried out in a radial direction in the direction of the linear movement axis Z by the honing tool O so that the teeth OZ of the honing tool O engage in the tooth gaps RL of the toothed wheel R which are associated therewith in each case and the honing tool O and the toothed wheel R roll on each other.

When the toothed wheel R, as in the present example, has an inclined tooth arrangement and the honing tool O is accordingly toothed in an oblique manner, a rotation movement of the toothed wheel R about the rotation axis C thereof is superimposed on the oscillating movement in the direction Z so that the individual teeth RZ of the toothed wheel R are moved in a helical movement by the honing tool O.

Figure 3:
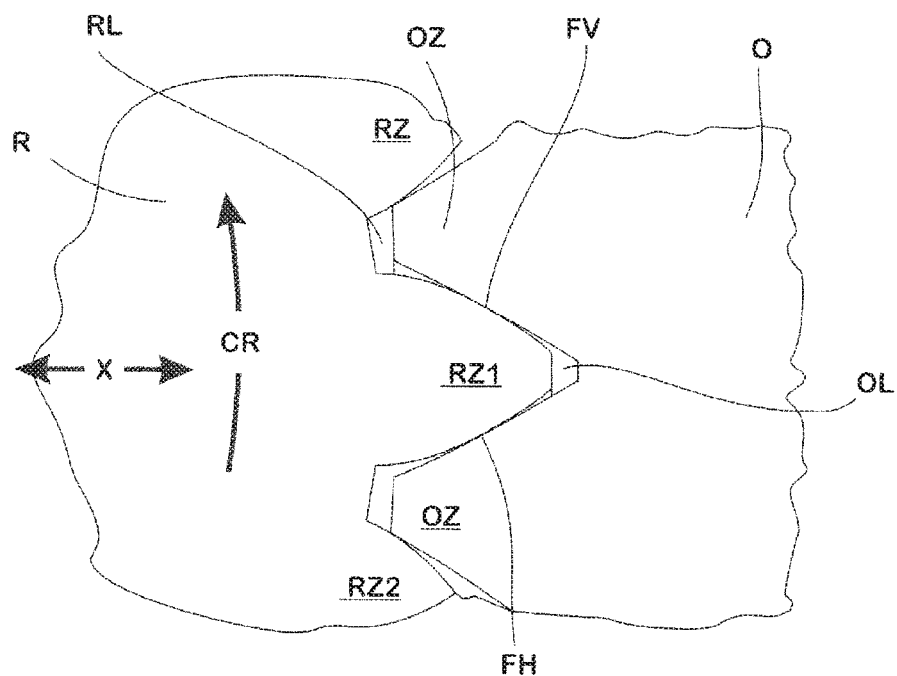
FIG. 3 is an enlarged view of the toothed wheel and the honing tool during the honing processing in a first operating position.

Whilst passing through the respective tooth gap RL there is contact between the teeth OZ of the honing tool O and the flanks FV, FH of the teeth RZ1, RZ2 which delimit the tooth gap RL which is associated with the respective tooth OZ of the honing tool O and material is removed at that location in accordance with the positioning in the X direction (FIG. 3).

Figure 4:
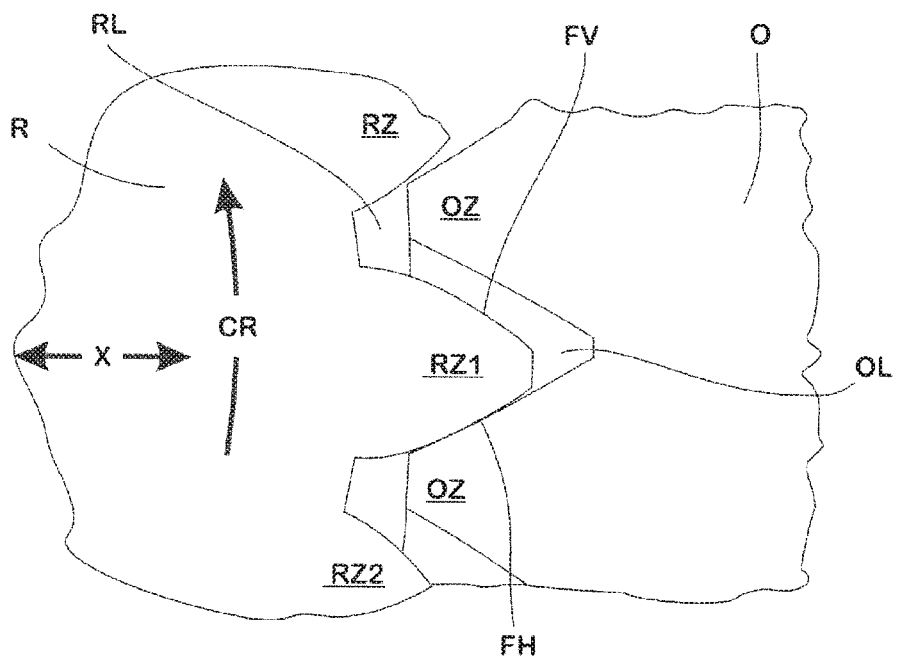
FIG. 4 is an enlarged view of the toothed wheel and the honing tool during the honing processing in a second operating position.

If the respective tooth OZ moves closer to the tooth edge RK which is located in front of it in the respective movement direction as a result of the relative movement between the honing tool O and toothed wheel R which is carried out in the linear movement direction X for the purposes of positioning in a radial direction, the toothed wheel R is changed in terms of the rotation position thereof by means of an additional rotation about the rotation axis C thereof in each case in such a manner that the respective tooth OZ of the honing tool O is retained in abutment with one of the tooth flanks FV, FH until it has been completely removed from the respective tooth gap RL of the toothed wheel R. FIG. 4 illustrates this with the example of the rear flank FH in the rotation direction CR of the toothed wheel R. In another revolution, this procedure is repeated for the front flank FV of the respective tooth RZ of the toothed wheel R in the rotation direction CR.

Figure 5:
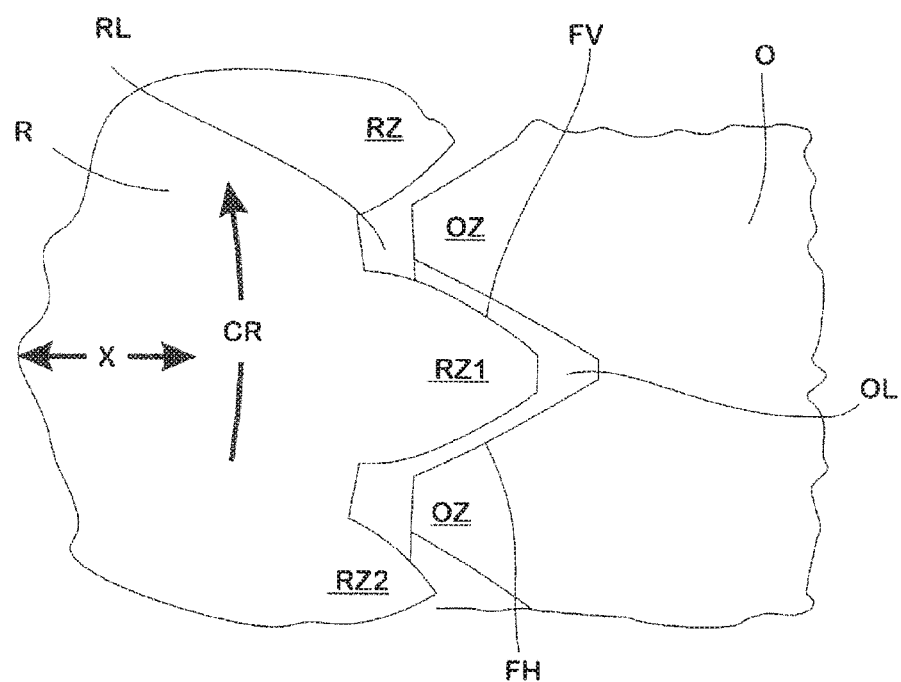
FIG. 5 is an enlarged view of the toothed wheel and the honing tool during the honing processing operation with a conventional processing method.

Without the tracking of the rotation position of the toothed wheel R according to the invention, the tooth RZ would, when removed in a radial direction X from the tooth gap, as shown in FIG. 5, be lifted from the honing tool O so that there would no longer be any contact between the honing tool O and the tooth RZ.

With the invention, there is consequently provided a method for honing processing a toothed wheel R in which the toothed wheel R and the honing tool O mesh with each other and the rotation axes B, C of the toothed wheel R and honing tool O intersect with each other at the axial intersection angle $\Sigma$. The toothed wheel R and honing tool O in this instance carry out an oscillating relative movement in an axial direction Z of the rotation axis C of the toothed wheel R and are at the same time positioned in a direction towards each other in a radial direction X with respect to the rotation axis C of the toothed wheel R starting from an end position in order to bring about a material removal on the toothed wheel R. In order to process toothed wheels R using such a method in such a manner that their surface nature is further optimised with respect to the noise production of a gear mechanism in which they are installed, the invention proposes that, during the oscillating relative movement which is directed in the axial direction Z of the rotation axis C of the toothed wheel R, the rotation position of the toothed wheel R with respect to the rotation axis C thereof is changed in accordance with the positioning in a radial direction X in such a manner that during the removal from the respectively associated tooth gap RL of the toothed wheel R, which removal leads to the end position of the radial positioning, there is contact between the respective tooth OZ of the honing tool O and one of the flanks FH of the teeth RZ2 of the toothed wheel R which delimit the tooth gap RL.

LIST OF REFERENCE NUMERALS

B Rotation axis of the tool spindle 11
CR Rotation direction of the toothed wheel R
C Rotation axis of the workpiece spindle 2
FV, FH Flanks of the teeth RZ1, RZ2
Honing tool
OL Tooth gap of the honing tool O
OZ Teeth of the honing tool O
R Toothed wheels
RZ,RZ1,RZ2 Tooth of the toothed wheel R
RL Tooth gaps of the toothed wheel R
RK Tooth edge
$\Sigma$ Axial intersection angle
W Pivot axis of the tool spindle 11
X, Y, Z Linear movement axes
1 Machine for honing processing toothed wheels R
2 Workpiece spindle 3 Longitudinal slide
4 Linear guide
5 Transverse slide
6 Linear guide
7 Machine bed
8 Loading device
9 Conveying device
10 Frame
11 Tool spindle

The invention claimed is:

1. A method for honing processing a toothed wheel comprising: bringing the toothed wheel to be honed into engagement with a honing tool having a tooth arrangement which corresponds to a tooth arrangement of the toothed wheel such that the toothed wheel and the honing tool rotate about respective rotation axes, wherein the rotation axes of the toothed wheel and honing tool are orientated so as to intersect with each other at an axial intersection angle, moving the toothed wheel and the honing tool in an oscillating manner relative to each other in an axial direction of the rotation axis of the toothed wheel between two reversal positions and positioning the toothed wheel and the honing tool in a direction towards each other starting from an end position in a radial direction with respect to the rotation axis of the toothed wheel in order to remove material from the toothed wheel, wherein, during the oscillating relative movement which is directed in an axial direction of the rotation axis of the toothed wheel, a rotation position of the toothed wheel relative to a rotation position of the honing tool is changed in accordance with the positioning of the toothed wheel in a radial direction such that, during removal of the honing tool from a respective tooth gap of the toothed wheel, said removal of the honing tool directed in the radial direction and leading to the end position, there is contact between the respective tooth of the honing tool and a flank of one of the teeth of the toothed wheel which delimit the respective tooth gap of the toothed wheel.

2. The method according to claim 1, wherein the toothed wheel has an external tooth arrangement and the honing tool has an internal tooth arrangement.

3. The method according to claim 2, wherein the honing tool and the toothed wheel to be honed each have an inclined tooth arrangement, and wherein a rotation about the rotation axis of the toothed wheel is superimposed on the oscillating relative movement which is directed in the direction of the rotation axis of the toothed wheel.

4. The method according to claim 1, wherein both during introduction into and removal from the respective tooth gap of the toothed wheel, said introduction starting from the respective end position of the positioning which is carried out in a radial direction, there is permanent contact between one of the tooth flanks of the teeth of the toothed wheel which delimit the tooth gap and the respective tooth of the honing tool.

5. The method according to claim 1, wherein the toothed wheel carries out at least two revolutions about the rotation axis thereof and wherein the respective tooth of the honing tool, in the event of a revolution during removal of the respective tooth of the honing tool from the toothed wheel, is kept in contact with the flank of the tooth gap of the toothed wheel associated therewith, said flank delimiting the tooth gap at a side thereof located at a front when viewed in the rotation direction of the toothed wheel, and, in the event of another revolution during the removal, the respective tooth of the honing tool is kept until it has been completely removed from the tooth gap in contact with the flank of the tooth gap associated therewith, said flank delimiting the tooth gap at a rear side thereof when viewed in the rotation direction of the toothed wheel.

6. The method according to claim 1, wherein the contact between the respective flank of the tooth of the toothed wheel and an associated flank of the respective tooth of the honing tool is permanently maintained until the toothed wheel has reached the end position of the positioning which is carried out in a radial direction.

7. The method according to claim 2, wherein both during introduction into and removal from the respective tooth gap of the toothed wheel, said introduction starting from the respective end position of the positioning which is carried out in a radial direction, there is permanent contact between one of the tooth flanks of the teeth of the toothed wheel which delimit the tooth gap and the respective tooth of the honing tool.

8. The method according to claim 3, wherein both during introduction into and removal from the respective tooth gap of the toothed wheel, said introduction starting from the respective end position of the positioning which is carried out in a radial direction, there is permanent contact between one of the tooth flanks of the teeth of the toothed wheel which delimit the tooth gap and the respective tooth of the honing tool.

9. The method according to claim 2, wherein the toothed wheel carries out at least two revolutions about the rotation axis thereof and wherein the respective tooth of the honing tool, in the event of a revolution during removal of the respective tooth of the honing tool from the toothed wheel, is kept in contact with the flank of the tooth gap of the toothed wheel associated therewith, said flank delimiting the tooth gap at a side thereof located at a front when viewed in the rotation direction of the toothed wheel, and, in the event of another revolution during the removal, the respective tooth of the honing tool is kept until it has been completely removed from the tooth gap in contact with the flank of the tooth gap associated therewith, said flank delimiting the tooth gap at a rear side thereof when viewed in the rotation direction of the toothed wheel.

10. The method according to claim 3, wherein the toothed wheel carries out at least two revolutions about the rotation axis thereof and wherein the respective tooth of the honing tool, in the event of a revolution during removal of the respective tooth of the honing tool from the toothed wheel, is kept in contact with the flank of the tooth gap of the toothed wheel associated therewith, said flank delimiting the tooth gap at a side thereof located at a front when viewed in the rotation direction of the toothed wheel, and, in the event of another revolution during the removal, the respective tooth of the honing tool is kept until it has been completely removed from the tooth gap in contact with the flank of the tooth gap associated therewith, said flank delimiting the tooth gap at a rear side thereof when viewed in the rotation direction of the toothed wheel.

11. The method according to claim 4, wherein the toothed wheel carries out at least two revolutions about the rotation axis thereof and wherein the respective tooth of the honing tool, in the event of a revolution during removal of the respective tooth of the honing tool from the toothed wheel, is kept in contact with the flank of the tooth gap of the toothed wheel associated therewith, said flank delimiting the tooth gap at a side thereof located at a front when viewed in the rotation direction of the toothed wheel, and, in the event of another revolution during the removal, the respective tooth of the honing tool is kept until it has been completely removed from the tooth gap in contact with the flank of the tooth gap associated therewith, said flank delimiting the tooth gap at a rear side thereof when viewed in the rotation direction of the toothed wheel.

12. The method according to claim 2, wherein the contact between the respective flank of the tooth of the toothed wheel and an associated flank of the respective tooth of the honing tool is permanently maintained until the toothed wheel has reached the end position of the positioning which is carried out in a radial direction.

13. The method according to claim 3, wherein the contact between the respective flank of the tooth of the toothed wheel and an associated flank of the respective tooth of the honing tool is permanently maintained until the toothed wheel has reached the end position of the positioning which is carried out in a radial direction.

14. The method according to claim 4, wherein the contact between the respective flank of the tooth of the toothed wheel and an associated flank of the respective tooth of the honing tool is permanently maintained until the toothed wheel has reached the end position of the positioning which is carried out in a radial direction.

15. The method according to claim 5, wherein the contact between the respective flank of the tooth of the toothed wheel and an associated flank of the respective tooth of the honing tool is permanently maintained until the toothed wheel has reached the end position of the positioning which is carried out in a radial direction.

\* \* \* \* \*